(12) United States Patent
Oster et al.

(10) Patent No.: US 12,379,701 B2
(45) Date of Patent: Aug. 5, 2025

(54) METHOD FOR TRANSMITTING DATA BETWEEN A CENTRAL CONTROL APPARATUS AND A PLURALITY OF DECENTRALIZED DEVICES, AND CORRESPONDING MEANS

(71) Applicant: Phoenix Contact GmbH & Co. KG, Blomberg (DE)

(72) Inventors: Viktor Oster, Blomberg (DE); Lutz Rahlves, Tündern (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 1045 days.

(21) Appl. No.: 16/641,613

(22) PCT Filed: Aug. 22, 2018

(86) PCT No.: PCT/EP2018/072679
§ 371 (c)(1),
(2) Date: Feb. 24, 2020

(87) PCT Pub. No.: WO2019/038333
PCT Pub. Date: Feb. 28, 2019

(65) Prior Publication Data
US 2020/0218284 A1    Jul. 9, 2020

(30) Foreign Application Priority Data
Aug. 25, 2017    (DE) .......................... 102017119578.5

(51) Int. Cl.
*G05B 19/042*    (2006.01)
*H04L 12/403*    (2006.01)
(Continued)

(52) U.S. Cl.
CPC ........ *G05B 19/0425* (2013.01); *H04L 12/403* (2013.01); *H04L 43/0847* (2013.01);
(Continued)

(58) Field of Classification Search
CPC ...... G05B 19/0425; G05B 2219/50393; G05D 1/0297; G05D 1/0022; H04L 43/0847;
(Continued)

(56) References Cited

U.S. PATENT DOCUMENTS 8,705,548 B2 *    4/2014    Meyer-Grafe ........ H04L 12/403
370/257
2003/0208283 A1 *    11/2003    Vasko ................ G05B 19/4185
714/1
(Continued)

FOREIGN PATENT DOCUMENTS

CN    101180837 A    5/2008
CN    206181057 U    5/2017
(Continued)

OTHER PUBLICATIONS

Fontanelli et al., "Performance Analysis of a Clock State Estimator for PROFINET IO IRT Synchronization", 2013 IEEE International Instrumentation and Measurement Technology Conference (12MTC) (pp. 1828-1833), total 6 Pages. (Year: 2013).*

(Continued)

*Primary Examiner* — Brian J. Gillis
*Assistant Examiner* — Chhian (Amy) Ling
(74) *Attorney, Agent, or Firm* — Kaplan Breyer Schwarz, LLP (57) ABSTRACT

More efficient data transmission of safety-relevant data is achieved by a method for transmitting data between the central control apparatus and a plurality of decentralized devices, which includes generating, in the central control apparatus, a data telegram for the broadcast or multicast transmission of data to a plurality of devices, unidirectionally transmitting the data telegram from the central control apparatus to at least one decentralized device, monitoring the transmission duration of the transmission of the data (Continued)

telegram from the central control apparatus to the at least one decentralized device, and triggering a predetermined safety reaction if the transmission duration exceeds a predefined value. Further, a control and data transmission system designed to carry out the method, and means belonging to such a system.

19 Claims, 4 Drawing Sheets

(51) Int. Cl.
    *H04L 43/0823*     (2022.01)
    *H04L 43/0852*     (2022.01)
    *H04L 43/106*     (2022.01)
    *H04L 43/16*     (2022.01)

(52) U.S. Cl.
    CPC ........ *H04L 43/0858* (2013.01); *H04L 43/106* (2013.01); *H04L 43/16* (2013.01); *G05B 2219/50393* (2013.01)

(58) Field of Classification Search
    CPC ... H04L 43/0858; H04L 43/106; H04L 43/16; H04L 12/403
    See application file for complete search history.

(56) References Cited

U.S. PATENT DOCUMENTS

| | | | | |
|---|---|---|---|---|
| 2004/0210323 | A1* | 10/2004 | Muneta | G05B 9/02 700/79 |
| 2005/0083954 | A1* | 4/2005 | Meyer-Grafe | H04L 12/403 370/403 |
| 2006/0015765 | A1* | 1/2006 | Jekal | H04L 67/1001 714/4.1 |
| 2007/0115865 | A1 | 5/2007 | Jokela et al. | |
| 2008/0062948 | A1* | 3/2008 | Ponnuswamy | H04W 28/18 370/342 |
| 2008/0121097 | A1* | 5/2008 | Rudakevych | G05D 1/0022 901/1 |
| 2008/0183929 | A1 | 7/2008 | Gottswinter | |
| 2009/0163136 | A1* | 6/2009 | Wienold | G01D 4/004 455/3.05 |
| 2010/0074262 | A1* | 3/2010 | Breit | H04L 12/403 370/400 |
| 2010/0098111 | A1* | 4/2010 | Sun | H03L 7/0807 370/509 |
| 2010/0125661 | A1* | 5/2010 | Perala | H04L 43/106 709/224 |
| 2010/0240298 | A1* | 9/2010 | McKenna | H04L 12/1859 455/3.05 |
| 2011/0064091 | A1* | 3/2011 | Darras | H04L 43/106 370/458 |
| 2011/0069698 | A1* | 3/2011 | Schmidt | H04L 12/403 370/351 |
| 2011/0188415 | A1* | 8/2011 | Graziano | H04N 21/42202 370/310 |
| 2013/0170388 | A1* | 7/2013 | Ito | H04L 43/0858 370/252 |
| 2013/0195114 | A1* | 8/2013 | Lessmann | H04L 12/4625 370/401 |
| 2014/0172223 | A1* | 6/2014 | Murphy | G05D 1/0289 701/25 |
| 2015/0045915 | A1* | 2/2015 | Schmidt | H04L 67/10 700/79 |
| 2016/0105773 | A1* | 4/2016 | Wawrowski | H04W 4/08 455/456.2 |
| 2017/0195110 | A1* | 7/2017 | Ruffini | H04W 56/0015 |
| 2017/0329321 | A1* | 11/2017 | Dai | G05B 19/048 |
| 2018/0182183 | A1* | 6/2018 | Mrowczynski | G08C 17/00 |

FOREIGN PATENT DOCUMENTS

| | | | |
|---|---|---|---|
| DE | 11201000588 | T5 | 7/2013 |
| DE | 102015211668 | | 12/2016 |
| EP | 1473606 | A9 | 11/2004 |
| EP | 1509005 | A1 | 2/2005 |
| EP | 1619849 | A1 | 1/2006 |
| EP | 1675311 | A1 | 6/2006 |
| EP | 2302841 | A1 | 3/2011 |
| JP | 2008-009794 | A | 1/2008 |
| JP | 2015-229462 | A | 12/2015 |
| WO | 2008/089901 | A1 | 7/2008 |
| WO | WO 2018/002172 | A1 * | 1/2018 ............. H04W 4/24 |

OTHER PUBLICATIONS

Google definition "central controller" (Year: 2017).*
Authorized Officer: Von Der Straven, G, International Search Report and Written Opinion issued in counterpart PCT application No. PCT/EP2018/072679, Nov. 7, 2018, 14 pp.
Authorized Officer: Nora Lindner, English translation of the International Preliminary Report on Patentability issued in counterpart PCT application No. PCT/EP2018/072679, Feb. 25, 2020, 8 pp.
Aneeq Mahmood et al., "A Simulation-based Comparison of IEEE 802.11's Timing Advertisement and SyncTSF for Clock Synchronization", IEEE World Conference On Factory Communication Systems (WFCS), May 27, 2015, DOI: 10.1109/WFCS.2015.7160569, 4 pp.
Office Action issued in European patent application No. 18762795.5-1216, Nov. 12, 2021, 15 pp. w/ translation.
Office Action issued in Chinese patent application No. 201880055182.9, Jul. 18, 2022, 17 pp. w/ translation.
Office Action and English Translation thereof issued in corresponding German Patent Application No. 10201719578.5 on Dec. 13, 2024.

* cited by examiner

METHOD FOR TRANSMITTING DATA BETWEEN A CENTRAL CONTROL APPARATUS AND A PLURALITY OF DECENTRALIZED DEVICES, AND CORRESPONDING MEANS

FIELD

The invention relates to a method for transmitting data between a central control apparatus and a plurality of decentralized devices, as well as corresponding means, broadcast or multicast transmission of data being provided for in particular.

BACKGROUND

The demand for automated guided vehicle systems (AGVS) in modern, automated storage and logistics systems has been on the rise for years. These AGVSs are typically based on floor-bound transport systems with automatically controlled vehicles whose main task is to transport materials. They substantially consist of one or a plurality of automated guided vehicles (AGV) having integrated control intelligence, a primary controller, location determining apparatuses and a communication device for exchanging job data between the primary controller and the AGV. Standardized radio systems such as WLAN or Bluetooth are very often used as the communication medium.

The goal of major providers and operators of such logistics systems is to have logistics buildings without people. The AGVs receive their transport jobs from a primary controller and carry them out completely autonomously. When their batteries are discharged, they automatically go to a charging station to recharge them. In principle, no human intervention is needed at all, although this is, of course, a purely theoretical consideration. It is common for vehicles with technical faults to fail or to require servicing. Human intervention may also be necessary, for example, if a load on an AGV slips. For reasons of functional safety, the vehicles must be stopped in a safety-oriented manner or drive at a safe, reduced speed as soon as a human enters the facility.

In some cases, some manufacturers implement this requirement with only a limited orientation toward safety. Other manufacturers rely on existing safety protocols, such as PROFIsafe. This approach is the correct one from a functional safety point of view. The PROFIsafe system has proven useful for many years and can also be transmitted economically by radio.

Due to cyclical, bidirectional point-to-point communication between the safety controller, referred to as F-host in PROFIsafe, and the safety-related field devices, referred to as F-devices in PROFIsafe, i.e. between the safe primary controller and the AGV, there is a large amount of communication traffic. This communication traffic grows linearly with the number of AGVs operated.

In addition, the job data must also be transmitted via this transmission channel. Due to the number of available bandwidths in Bluetooth or WLAN systems, the number of vehicles is severely limited. It is therefore not possible to sensibly use this type of solution in mid-sized to large facilities. Due to the addressing and the safety measures used, PROFIsafe is not suitable for broadcast or multicast transmission.

A method for optimized transmission of data between a control apparatus and a plurality of field devices that are connected to one another via an IP-based communication network is known from EP 2 115 948 A1, the data transmission being controlled using a PROFINET protocol. In this method, the data to be transmitted from a control apparatus to a plurality of field devices can be transmitted in a single frame divided into data fields and the data to be transmitted from a plurality of field devices to a control apparatus can be transmitted in only a single common frame divided into data fields to increase the transmission rate compared to the transmission rate achieved with standard PROFINET frames by reducing the number of filler bits to be transmitted.

EP 1 509 005 A1 proposes defining a broadcast telegram within the point-to-point transmission protocol, within which selected data can be transmitted in a broadcast transmission mode, to transmit data via a bus network to which a plurality of users are connected and in which data is transmitted from at least one user to at least one other user by means of a data transmission protocol configured for point-to-point transmission in each communication cycle.

However, these methods are also not suitable for allowing safety-oriented communication between the primary controller and the AGV that can be used sensibly in mid-sized to large facilities in the automated guided vehicle systems described above.

SUMMARY

The object of the invention is therefore to provide a method as well as a control and data transmission system with which simplified or improved, in particular more efficient data transmission between a control apparatus and decentralized devices can be achieved.

This object is achieved by the features of the independent claims. Advantageous embodiments are the subject of the dependent claims, the specified features and advantages substantially being applicable to all independent claims.

A central idea of the invention can be seen in a unidirectional transmission of a multicast or broadcast telegram from a central control apparatus to a plurality of decentralized devices, the data telegram in particular comprising safe user data and additional information for protecting the transmission, and it being provided that the transmission duration of the transmission of the data telegram is monitored to protect against a systematic delay in the transmission of the data telegram along the transmission path, which usually cannot be recognized in the case of a unidirectional transmission, and a predetermined safety reaction is triggered if a predetermined transmission duration is exceeded, the invention providing for two variants that can be used alternatively or cumulatively to monitor the transmission duration. The first variant provides for time synchronization between the transmitter unit and receiver unit, i.e. between the central control apparatus and the respective decentralized device, while the second variant provides for monitoring of the quality of a separate bidirectional data transmission by means of a diagnostic unit on the transmitter and/or receiver side, which diagnostic unit uses the same transmission path as the unidirectional transmission of the data telegram.

A method for transmitting data between a central control apparatus and a plurality of decentralized devices comprises the following steps:
  generating in the central control apparatus of a data telegram for the broadcast or multicast transmission of data to a plurality of devices,
  unidirectional transmission of the data telegram from the central control apparatus to at least one decentralized device, monitoring of the transmission duration of the transmission of the data telegram from the central control apparatus to the at least one decentralized device, and triggering of a predetermined safety reaction if the transmission duration exceeds a predetermined value.

The unidirectional transmission of the data telegram typically takes place to a plurality of decentralized devices, the data telegram being generated and transmitted as a broadcast data telegram that is directed at all decentralized devices or as a multicast data telegram that is directed at a predetermined group of decentralized devices.

In the case of a multicast data telegram, the data telegram comprises a multicast address by means of which the group of decentralized devices at which the data telegram is directed is addressed. In this case, each of the decentralized devices that is part of the group knows the corresponding multicast address.

In an advantageous embodiment of the method, a group of decentralized devices can also be selected or addressed by specifying a spatial region. In this embodiment, the data telegram is configured for the multicast transmission of data to a group of devices that are located in a defined spatial region, the data telegram comprising identification information for this purpose that identifies the defined spatial region. The at least one decentralized device is advantageously designed to recognize whether it is currently located in the region identified by the identification information.

The process of recognizing whether the respective decentralized device is located in the identified spatial region can be carried out in a variety of ways. For example, the decentralized device can have a position determining apparatus, such as a GPS receiver, as well as means for determining whether a position currently determined by the position determining apparatus is located within the identified spatial region. However, a plurality of other sensors is conceivable that can be suitable for determining whether the decentralized device is located in the identified spatial region, it being possible to arrange in the identifiable spatial regions corresponding apparatuses for transmitting signals that can be detected by the respective sensor.

The transmission of a broadcast or multicast data telegram can also take place repeatedly, in particular cyclically in predetermined transmission cycles.

In a first variant of the invention, the control apparatus and the at least one decentralized device each have a timer. In the typically provided plurality of decentralized devices, each of the decentralized devices has a timer. Furthermore, it is provided that the timer in the control apparatus is synchronized with the respective timer in the at least one decentralized device. In particular, the synchronization takes place before the respective at least one decentralized device is put into operation, as well as alternatively or additionally in predetermined cyclical time intervals. The time intervals of a cyclical synchronization can advantageously be determined as a function of the accuracy error of the timer used.

In this variant, it is provided that a time stamp is generated by the control apparatus when the data telegram is generated, which time stamp is transmitted within the data telegram, the monitoring of the transmission duration taking place as a function of the time stamp. To generate the time stamp, the control apparatus retrieves, in particular, the current time from the timer.

By carrying out a synchronization before the respective decentralized device is put into operation, it is possible to ensure that the timers used to monitor the transmission duration are already synchronized the first time a data telegram is transmitted after the decentralized device is put into operation.

The timer in the control apparatus can advantageously serve as a reference timer during the synchronization, by means of which reference timer the timers of the decentralized devices are each synchronized. It is also conceivable for a reference timer to be arranged in a separate reference module and a synchronization of the timer in the control apparatus and the timers in the decentralized devices to be synchronized with this reference timer.

The reference timer can, for its part, advantageously be synchronized with a time standard at predetermined time intervals, for example using the DCF77 time signal transmitter.

In a second variant of the invention, the method comprises the following steps:
establishment of a data connection configured for bidirectional communication between the control apparatus and the at least one decentralized device, the data telegram being transmitted unidirectionally from the control apparatus to the at least one decentralized device via this data connection, and
monitoring of the transmission quality of the data connection by the control apparatus and/or by the at least one decentralized device, the monitoring of the transmission duration of the transmission of the data telegram taking place as a function of the monitored transmission quality.

In an advantageous embodiment of the invention, the at least one decentralized device is designed as an automated guided vehicle (AGV).

In this embodiment, job data is, in the second variant of the invention described above, typically transmitted via a bidirectional data connection from the control apparatus to individuals of the decentralized devices, which the respective decentralized device uses to handle individual transport jobs.

The bidirectional data transmission can take place, for example, via a wireless network, for example using WLAN or Bluetooth.

The control apparatus can monitor the transmission quality of the bidirectional data connection, for example by means of a corresponding diagnostic unit, and, in particular, determine a delay time with which the control apparatus receives a response to a data message from the decentralized device. The control apparatus can use this delay time to deduce how long it took or how long it took at most to transmit the data message from the control apparatus to the decentralized device. Alternatively or additionally, analog monitoring can take place by means of a corresponding diagnostic unit arranged in the decentralized device, the decentralized device in particular being able to determine a delay time with which the decentralized device receives a response to a data message from the control apparatus.

If the broadcast or multicast data telegram is unidirectionally transmitted using the same data connection that is used for the bidirectional communication as unidirectional transmission, the respective diagnostic unit can also estimate a transmission duration for this transmission or determine a value that indicates the maximum transmission duration required.

In this way, the respective diagnostic unit can monitor the transmission duration of the transmission of the data telegram from the central control apparatus to the at least one decentralized device and trigger a predetermined safety reaction if the transmission duration exceeds a predetermined value. In the case of a diagnostic unit arranged in the control apparatus, the safety reaction can, for example, consist of stopping the relevant decentralized device or all of the decentralized devices, a corresponding shut-off command being transmitted from the control apparatus to the respective decentralized device(s) for this purpose. In the case of a diagnostic unit arranged in the decentralized device, the safety reaction can likewise advantageously consist of stopping the respective decentralized device, the stopping being initiated by the diagnostic unit arranged in the decentralized device. Particularly advantageously, a decentralized device is thus shut off or stopped or otherwise transferred into a safe state if the diagnostic unit of the relevant decentralized device determines that the communication is taking too long or if the decentralized device receives a corresponding shut-off command from the control apparatus.

For wireless, unidirectional transmission of the broadcast or multicast data telegram, the control apparatus advantageously comprises a transmitter unit and the decentralized devices comprise corresponding receiver units. However, the transmission of the broadcast or multicast data telegram does not necessarily need to be wireless. Rather, wired data transmission can also be provided.

Furthermore, various known or standardized transmission protocols can be used to transmit the broadcast or multicast data telegram. Known protocols can also be supplemented in a suitable manner or new protocols can be provided, by means of which the data transmission is implemented.

The multicast or broadcast data telegram is, in particular, used to transmit safety-relevant or safety-oriented data. In the case of decentralized devices designed as AGVs, the safety-oriented data can be used to, for example, stop the decentralized devices in a safety-oriented manner or to instruct them to drive at a reduced speed. The transmission of the safety-oriented data in the form of the multicast or broadcast data telegram can take place, for example, as a response to a sensor signal received by the control apparatus that signals that a person has entered the facility. A corresponding sensor could be designed, for example, as a light grid or safety door.

However, any other suitable type of safety-oriented or safety-relevant data, as used in the area of the functional safety of technical facilities or automation systems, is also conceivable.

Particularly advantageously, a safe communication protocol that per se uses known methods for preventing and detecting faults is used to transmit the multicast or broadcast data telegram. In particular, protocols are used that can handle various types of faults, such as falsification, losses or mix-ups. For example, a sequential number, a transmitter ID and a CRC checksum can be provided.

To also handle the delay fault type given unidirectional transmission of the multicast or broadcast data telegram, for which bidirectional communication is usually required, the invention provides for monitoring of the transmission duration of the multicast or broadcast data telegram.

A control apparatus for controlling a plurality of decentralized devices that is suitable for carrying out the method described above comprises a means for generating a data telegram for the broadcast or multicast transmission of data to the plurality of devices, a means for the unidirectional transmission of the data telegram to at least one decentralized device, and a means for monitoring the transmission duration of the unidirectional transmission of the data telegram from the central control apparatus to the at least one decentralized device.

In a first advantageous embodiment of the control apparatus, the means for monitoring the transmission duration comprises a timer and a means for synchronizing the timer with a timer arranged in the at least one decentralized device, the means for generating the data telegram being designed to generate a time stamp and transmit it within the data telegram.

In a second advantageous embodiment of the control apparatus, it is designed to establish a data connection configured for bidirectional communication with the at least one decentralized device, the means for the unidirectional transmission of the data telegram being designed for the unidirectional transmission of the data telegram via the data connection, and the means for monitoring the transmission duration comprising a diagnostic unit that is designed to monitor the transmission quality of the data connection configured for bidirectional communication, to monitor the transmission duration of the unidirectional transmission of the data telegram as a function of the monitored transmission quality, and to trigger a predetermined safety reaction if the transmission duration exceeds a predetermined value.

The aforementioned technical object is further achieved by a device that can be controlled by a central control apparatus, which device is designed to receive a data telegram from the control apparatus for the broadcast or multicast transmission of data, the data telegram comprising a time stamp, and which device comprises a timer and a means for synchronizing the timer with a timer arranged in the control apparatus, as well as a means for monitoring the transmission duration of the transmission of the data telegram from the central control apparatus to the device as a function of the time stamp contained in the data telegram and using the timer, and a means for triggering a predetermined safety reaction if the transmission duration exceeds a predetermined value.

The scope of the invention also includes a control and data transmission system that comprises a control apparatus as described above and at least one device as described above that can be controlled by the control apparatus, and a communication network via which the control apparatus can transmit data to the at least one device.

It should be noted that the control apparatus, the device that can be controlled by the control apparatus, and the control and data transmission system can each advantageously be designed to carry out the various embodiments of the method described above.

BRIEF DESCRIPTION OF THE DRAWINGS

This and further features and advantages of the present invention are also set forth in the embodiments, which will be described in more detail below with reference to the attached drawings. In the figures.

DETAILED DESCRIPTION

The invention allows unidirectional, in particular cyclical, transmission of safe output data from a central point or a central controller to more than one decentralized device, such as an automated guide vehicle (AGV), in the form of a multicast or broadcast data telegram, the transmission in particular being wireless, for example via a radio link or by means of optical transmission. The embodiments illustrated below relate to the control of AGVs and assume wireless transmission of the multicast or broadcast data telegrams. However, using the invention in wired applications is also conceivable in order to save bandwidth.

Figure 1:
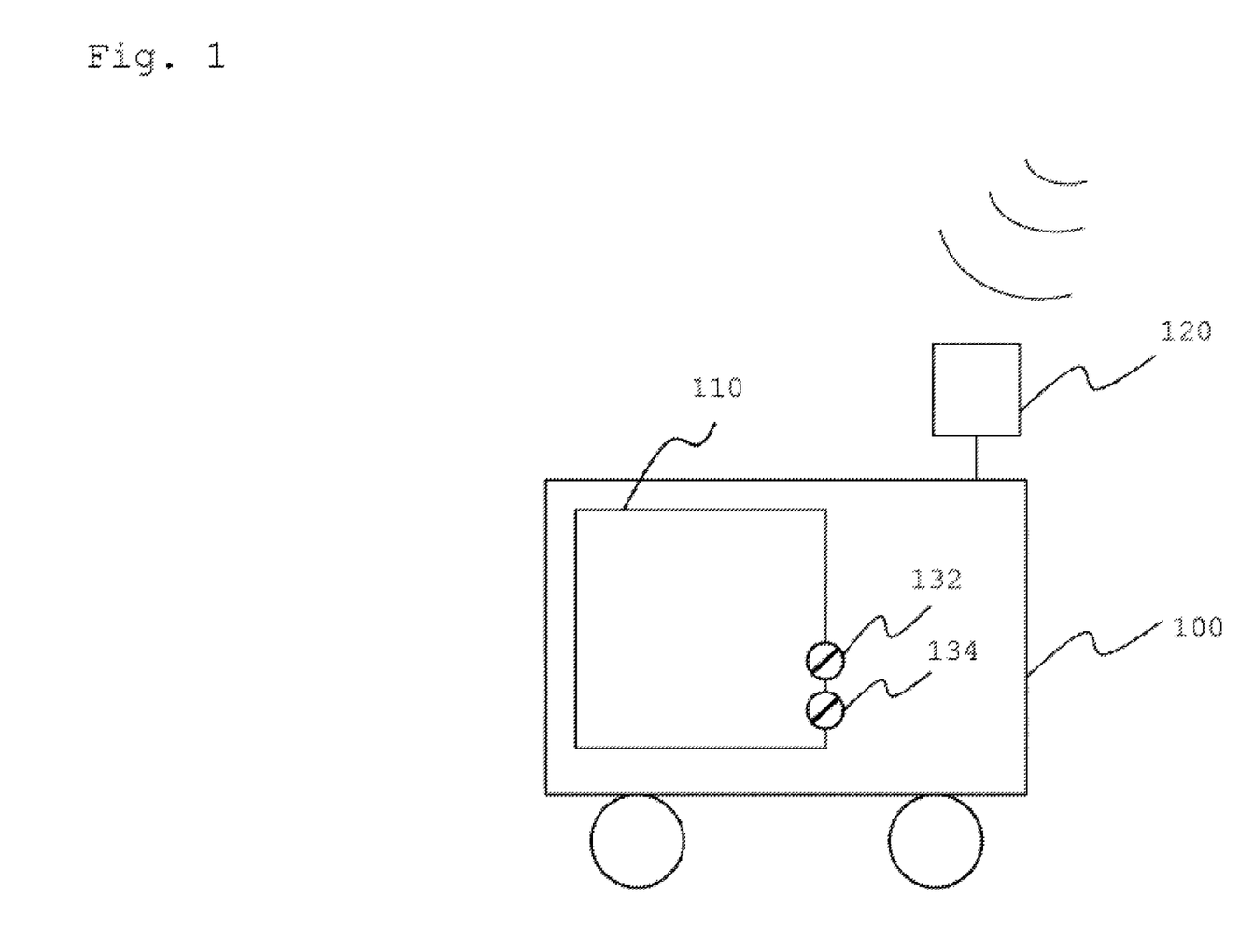
FIG. 1 shows a schematic representation of a decentralized device designed as an automated guided vehicle.

FIG. 1 shows a schematic representation of a decentralized device 100 designed as an automated guided vehicle (AGV). The AGV 100 comprises a receiver unit 110 for evaluating the data telegrams that were received by means of a receiving interface 120, the receiving interface 120 being designed, for example, to receive radio signals. In the example shown, the AGV 100 is designed to control the safe outputs 132 and 134 as a function of the safe output data that was received by the receiver unit 110. For example, the safe outputs 132 and 134 serve to control the drive of the AGV 100.

Figure 2:
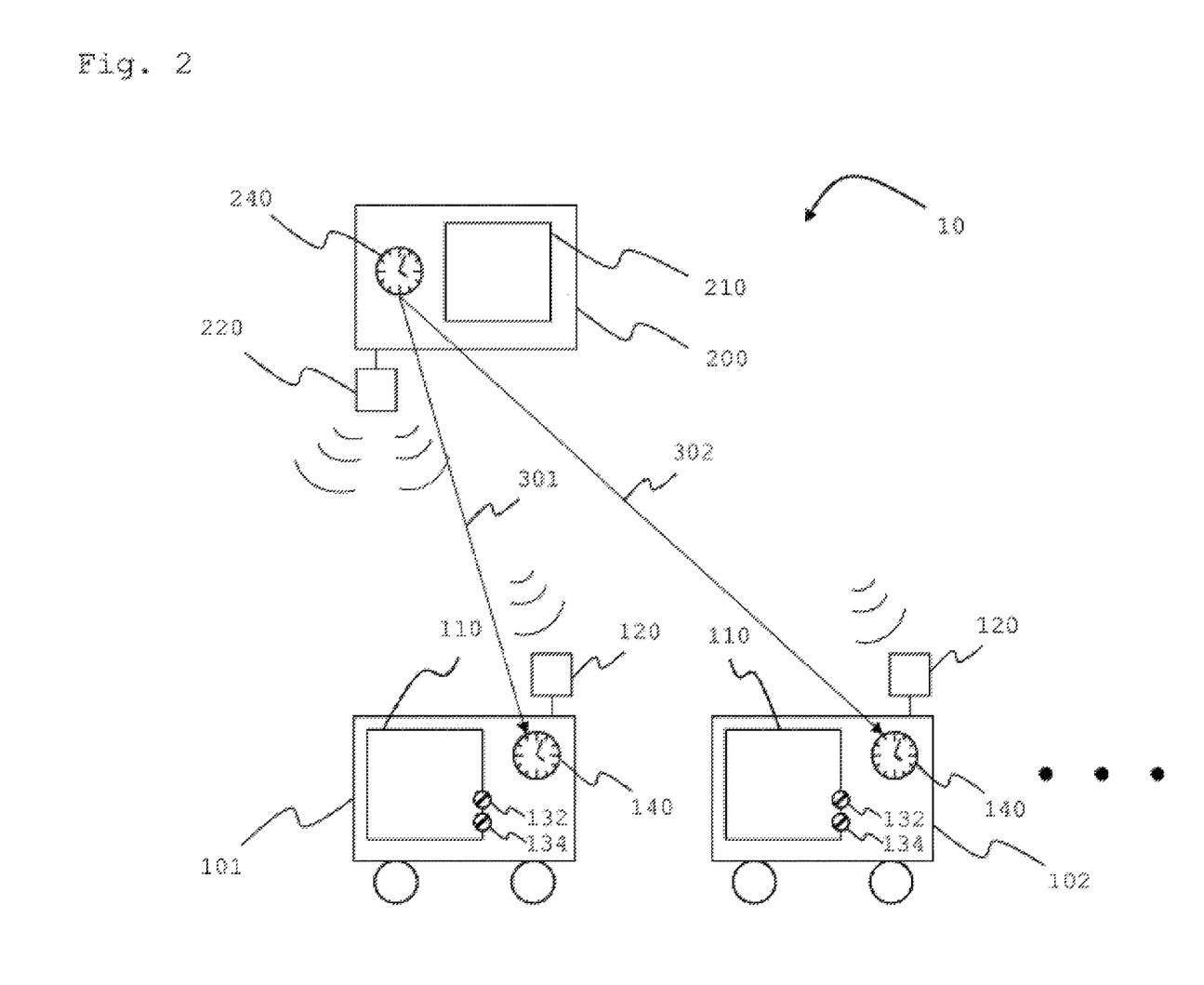
FIG. 2 shows a schematic representation of a time synchronization in a first preferred embodiment of a control and data transmission system according to the invention.
Figure 3:
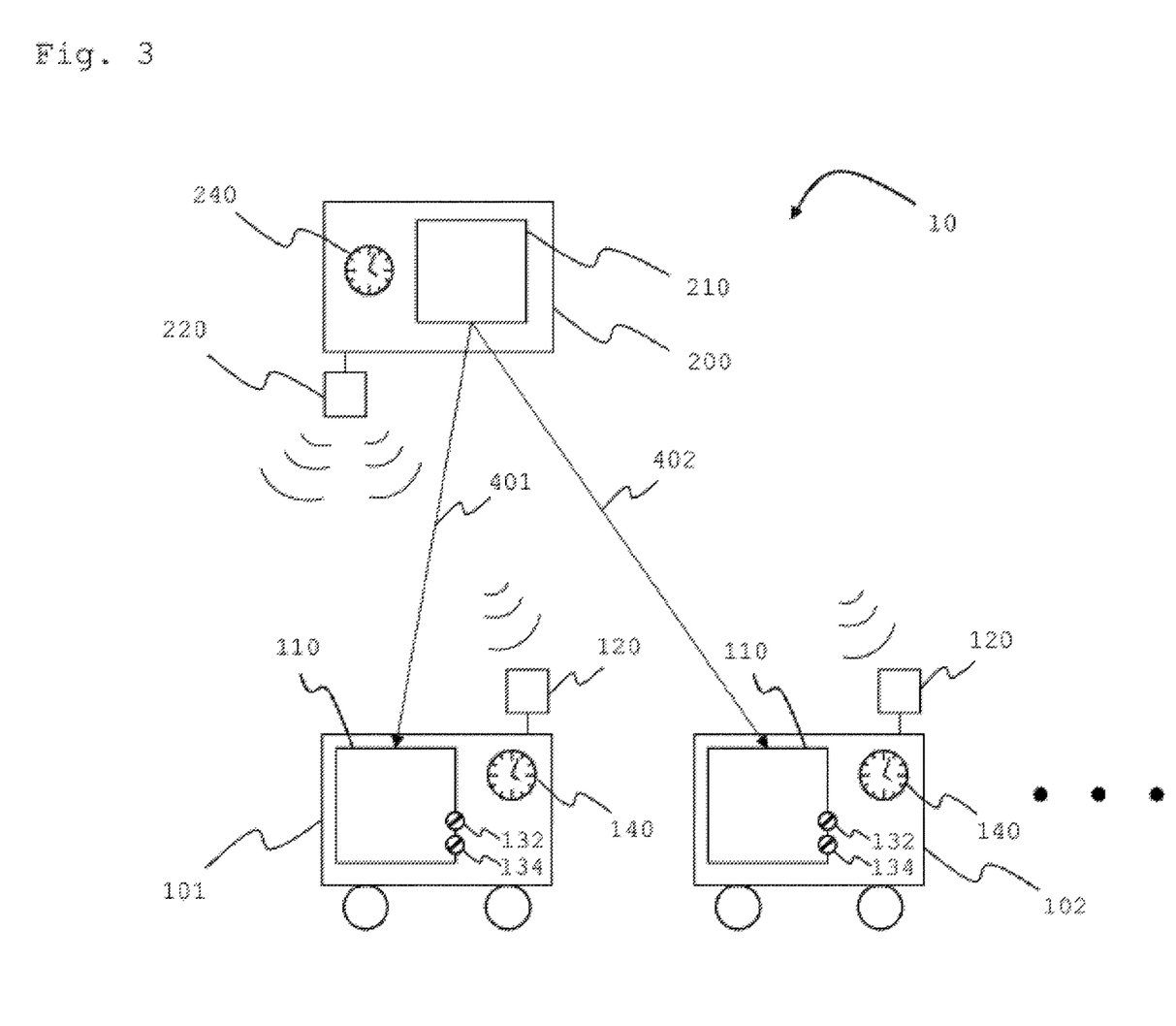
FIG. 3 shows a schematic representation of an operating phase of the control and data transmission system shown in FIG. 2.

FIGS. 2 and 3 show a schematic representation of a first preferred embodiment of a control and data transmission system 10 according to the invention that comprises a central control apparatus 200 and a plurality of decentralized devices designed as AGVs, of which only the devices 101 and 102 are shown as examples in the interest of simplicity. It should be noted that the invention can be used particularly advantageously in a system having a plurality of decentralized devices.

The control apparatus 200 comprises a transmitter unit 210 that transmits a multicast or broadcast data telegram by means of a transmission interface 220. In the embodiment shown, this data telegram contains on the one hand safe user data for the safe outputs 132 and 134 of the respective devices 101 and 102, as well as additional information for protecting the transmission. To protect communication, it is advantageously possible to use existing mechanisms, for example from PROFIsafe or Interbus-Safety. In particular, the data telegram can contain a sequential number, a transmitter ID and a CRC checksum for the faults to be detected. These measures make it possible to detect telegram mix-ups and changes. The sequential number can be used to trigger a watchdog in the respective receiver 101 or 102. These measures are comparable to existing safety protocols. As an alternative to the transmitter ID, it is also possible to use standard mechanisms of a network, such as subnetworks.

However, because the transmission of the multicast or broadcast data telegram is unidirectional communication, components that cause a systematic delay on the transmission path, also referred to as components with storage behavior, cannot be recognized.

For this reason, PROFIsafe uses, for example, bidirectional communication to detect such faults, with the disadvantages already described at the outset, in particular when used in the logistics industry.

To allow such faults to also be detected in the case of unidirectional communication, the invention provides for timers 140 or 240 in the AGVs 101 and 102 as well as in the control apparatus 200, time synchronization taking place between the transmission station 200 and the receiver units 101 and 102 before the individual AGVs start. For this purpose, tried-and-tested standards for application in an Ethernet environment, such as the IEEE 1588 standard or the Network Time Protocol (NTP), exist that can be used for Ethernet-based communication or adapted accordingly for use with other transmission protocols.

As soon as a receiver unit 101 or 102 has the current time and receives valid safety protocols, it can declare the user data valid and output it at the outputs 132 and 134. For this purpose, the transmitter unit 210 adds a time stamp to each multicast or broadcast data telegram to be output using the timer 240, and the respective receiver unit 110 monitors the transmission duration of the unidirectionally transmitted data telegram as a function of the time stamp and using the synchronized timer 140. If a predetermined limit value stored in the respective decentralized device is exceeded, the receiver unit 110 triggers a predetermined safety reaction, said safety reaction, for example, consisting of shutting off the drive.

In the embodiment shown, the time synchronization does not solely take place when the system is switched on. It also takes place at suitable intervals to, on the one hand, keep the times in the receiver units 101 or 102 up-to-date and, on the other hand, to reintegrate receiver units that were switched on later or had failed back into the system that is running.

Successful time synchronization between the transmitter unit 210 and the respective receiver unit 110 is thus necessary before the receiver unit 110 may switch on the safe outputs. This time synchronization, which in the embodiment shown takes place when the system is switched on and at suitable time intervals during ongoing operation, is illustrated symbolically in FIG. 2 by the arrows 301 and 302.

If the receiver unit 110 considers the time synchronization to have been successful, the operating phase depicted in FIG. 3 begins, in which the transmitter unit 210 transmits broadcast data telegrams to all users or multicast data telegrams to user groups that contain the safety-oriented output data, for example the release for the drives of the respective AGVs 101 or 102 in the embodiment shown. The transmission of the multicast or broadcast data telegrams is shown symbolically in FIG. 3 by the arrows 401 and 402.

It should also be noted that the described components of a decentralized device do not necessarily need to be integrated into the decentralized device but can also be part of a separate remote module, it also being possible in particular to relocate only the functionality of the monitoring of the transmission duration and/or the triggering of a safety reaction to a separate module to add a functionality according to the invention to existing devices.

Figure 4:
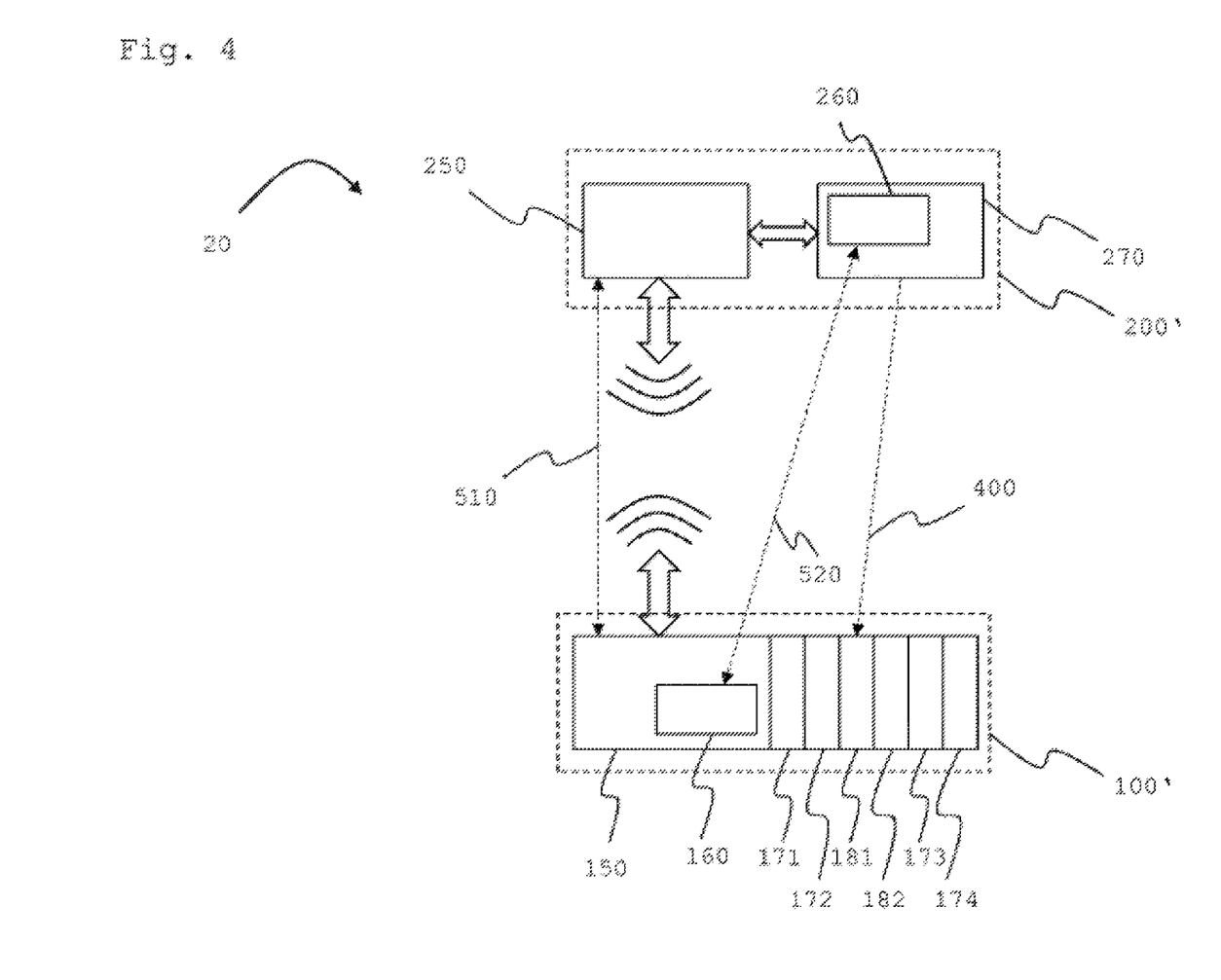
FIG. 4 shows a schematic representation of a second preferred embodiment of a control and data transmission system according to the invention.

FIG. 4 shows a schematic representation of a second preferred embodiment of a control and data transmission system 20 according to the invention. In the interest of simplicity, FIG. 4 shows only one decentralized device 100', it being noted that a plurality of decentralized devices are also advantageously provided for in this embodiment.

This embodiment provides for monitoring the quality of the data transmission by a diagnostic unit. Because the AGVSs require a bidirectional data connection to handle jobs, it can be used to monitor the connection quality. A prerequisite for this is that the safety-relevant data is exchanged via the same connection, which is done unidirectionally but nonetheless using the same data connection. Thus, it is no longer necessary to transmit the time stamp because, if the maximum permissible delay time is exceeded, this diagnostic unit sends the information to the safe logic that causes the AGV to shut off.

In the embodiment shown in FIG. 4, a control apparatus 200' is provided that comprises a higher-level PLC 250 and a safe PLC 270 that can communicate with each other. The decentralized device 100' designed as an AGV comprises a local PLC 150 having a plurality of I/O devices connected to it, said local PLC comprising standard I/O devices 171, 172, 173 and 174, as well as safe or safety-oriented I/O devices 181 and 182. The I/O devices can be connected to the local PLC 150, for example via a bus, for example a backplane bus. The job data of the AGV 100' is transmitted from the higher-level PLC 250 to the local PLC 150 by means of bidirectional communication.

This communication is depicted by the arrow 510. In the embodiment shown, the communication 510 is designed as wireless communication.

In the embodiment shown, the multicast or broadcast data telegram from the safe PLC 270 is transmitted unidirectionally from the control apparatus 200' to the AGV 100', the same communication connection being used as for the bidirectional transmission of the job data. In other words, the multicast or broadcast data telegram is sent to the higher-level PLC 250 and transmitted from the latter to the local PLC 150 and evaluated. If valid, the safety-oriented data contained in the multicast or broadcast data telegram is output to the safe I/O devices 181 or 182, which are designed as safe outputs in the embodiment shown. The unidirectional transmission of the safe output data to the safe outputs 181 and 182 is shown in FIG. 4 by the arrow 400.

The transmission quality of the bidirectional data transmission 510 can be monitored by means of a diagnostic unit 260 arranged in the safe PLC 270, the diagnostic unit 260 bringing about the transmission of a shut-off command to the AGV 100' if the monitoring of the bidirectional data transmission 510 used to transmit the job data shows that a predetermined delay time is exceeded.

Alternatively or additionally, a diagnostic unit 160 can also be arranged in the AGV 100', which diagnostic unit monitors the transmission quality of the bidirectional data transmission 510 and shuts off the drive of the AGV 100' if a predetermined delay time is exceeded.

It is also conceivable for bidirectional data transmission to take place at cyclical intervals between the diagnostic units 260 and 160 for test purposes, which bidirectional data transmission is shown in FIG. 4 as arrow 520, and for the transmission quality of this bidirectional data transmission 520 to be monitored.

Use of the invention is not only limited to AGVs, but is also possible in any applications in which broadcast or multicast messages are to be sent to many users with a defined time expectation, regardless of the infrastructure.

For example, the method according to the invention also permits group connections via the cloud for power supply systems.

The invention offers a plurality of advantages, a particular advantage being that a large number of receivers can receive data in a safety-oriented manner without overloading the respective network with point-to-point communication that would otherwise be necessary. This saves bandwidth and guarantees reliable broadcast or multicast transmission.

In addition, the invention can be used in various fields of application from safety to power supply, offers an inexpensive solution and makes quick reaction times possible because all users can be addressed at the same time.

Certain applications, for example the simultaneous, safe control of a large number of AGVs in the logistics industry, are made possible in the first place by the method according to the invention.

Simultaneous switching of operating modes is also possible, for example a reduction in speed if a person has entered the danger zone. This opens up further possibilities for human-machine interaction.

The invention claimed is:

1. A method for transmitting data between a central control apparatus and a plurality of decentralized devices, having the following steps:
   generating, in the central control apparatus, a data telegram for the multicast transmission of data to a group of the of devices that are located in a defined spatial region, the data telegram comprising identification information that identifies the defined spatial region;
   unidirectionally transmitting the data telegram from the central control apparatus to at least one of the decentralized devices of the group, wherein the at least one of the decentralized devices of the group is designed to recognize whether it is currently located in the spatial region identified by the identification information, and wherein the data telegram is transmitted wirelessly from the central control apparatus to the at least one of the decentralized devices of the group;
   monitoring the transmission duration of the transmission of the data telegram from the central control apparatus to the at least one of the decentralized devices of the group, wherein the monitoring step is performed with synchronized timers or wherein the monitoring step is performed by the step of establishing a data connection configured for bidirectional communication between the central control apparatus and the at least one of the decentralized devices of the group, the data telegram being transmitted unidirectionally from the central control apparatus to the at least one of the decentralized devices of the group via this data connection; and
   triggering a predetermined safety reaction if the transmission duration exceeds a predetermined value.

2. The method according to claim 1, wherein the step of monitoring is performed with the synchronized timers and wherein the central control apparatus and the at least one of the decentralized devices of the group each comprises one of the synchronized timers, and wherein the method further comprises the following steps:
   synchronizing the timer in the central control apparatus with the respective timer in the at least one of the decentralized devices of the group;
   generating a time stamp by the central control apparatus and transmission of the time stamp within the data telegram, the transmission duration being monitored as a function of the time stamp.

3. The method according to claim 2, wherein the timers are synchronized before the at least one of the decentralized devices of the group is put into operation and/or at predetermined intervals of time.

4. The method according to claim 1, wherein the step of monitoring is performed by the step of establishing the data connection configured for bidirectional communication between the central control apparatus and the at least one of the decentralized devices of the group, and further comprising the step of:
   monitoring of the transmission quality of the data connection by the central control apparatus and/or by the at least one of the decentralized devices of the group, the monitoring of the transmission duration of the transmission of the data telegram taking place as a function of the monitored transmission quality.

5. The method according to claim 1, wherein the at least one of the decentralized devices of the group is designed as an automated guided vehicle.

6. The method according to claim 1, wherein the wireless transmission of the data telegram takes place via a wireless network.

7. The method according to claim 1, wherein the data telegram is used to transmit safety-relevant data.

8. The method according to claim 1, wherein a safe communication protocol is used to transmit the data telegram.

9. The method according to claim 1, wherein the at least one of the decentralized devices of the group is designed as an automated guided vehicle, and wherein the at least one of the decentralized devices of the group comprises a position determining apparatus and is adapted to determine whether a position currently determined by the position determining apparatus is located within the spatial region identified by the identification information.

10. The method according to claim 1, wherein the at least one of the decentralized devices of the group is designed as an automated guided vehicle, comprising a sensor suitable for determining whether the decentralized device is located within the spatial region identified by the identification information, wherein the sensor is adapted to detect signals transmitted by an apparatus arranged in an identifiable spatial region.

11. A control apparatus for controlling a plurality of decentralized devices, the control apparatus designed for generating a data telegram for the broadcast or multicast transmission of data to the plurality of decentralized devices, the control apparatus comprising:
a central controller;
a transmitter unit for unidirectionally transmitting the data telegram to at least one of the decentralized devices, wherein the data telegram is transmitted wirelessly from the control apparatus to the at least one of the decentralized devices; and
a first timer for monitoring the transmission duration of the unidirectional transmission of the data telegram from the control apparatus to the at least one of the decentralized devices,
wherein the control apparatus is further designed to establish a data connection configured for bidirectional communication with the at least one of the decentralized devices,
wherein the transmitter unit unidirectionally transmits the data telegram via the data connection, and
wherein the first timer comprises a diagnostic unit that is designed to:
monitor the transmission quality of the data connection configured for bidirectional communication, wherein a delay time is determined, with which the control apparatus receives a response to a data message from the at least one of the decentralized devices;
monitor the transmission duration of the unidirectional transmission of the data telegram as a function of the monitored transmission quality, wherein the central controller uses the determined delay time to deduce how long it took or how long it took at most to transmit the data message from the control apparatus to the at least one of the decentralized devices; and
trigger a predetermined safety reaction if the transmission duration exceeds a predetermined value.

12. The control apparatus according to claim 11, further comprising a second timer serving as a reference timer for synchronizing the first timer with a timer arranged in the at least one of the decentralized devices, and wherein the control apparatus is further designed to generate a time stamp and transmit it within the data telegram.

13. The control apparatus according to claim 11, wherein the timer for monitoring the transmission duration of the unidirectional transmission of the data telegram from the control apparatus to the at least one of the decentralized devices, further comprises a receiver unit and/or a diagnostic unit.

14. A device designed as an automated guided vehicle that can be controlled by a central control apparatus, the device comprising:
a diagnostic unit for monitoring the transmission duration of the unidirectional transmission of the data telegram from the central control apparatus to the device, wherein the monitoring is performed with synchronized timers or wherein the monitoring is performed by establishing a data connection configured for bidirectional communication between the central control apparatus and the at least one of the decentralized devices of the group, the data telegram being transmitted unidirectionally from the central control apparatus to the at least one of the decentralized devices of the group via this data connection, and wherein the diagnostic unit is designed for triggering a predetermined safety reaction if the transmission duration exceeds a predetermined value,
wherein the device designed to receive a unidirectionally transmitted data telegram from the central control apparatus, the data telegram for the multicast transmission of data to a group of the devices that are located in a defined spatial region, the data telegram comprising identification information that identifies the defined spatial region, wherein the data telegram is transmitted wirelessly from the central control apparatus, the device designed to recognize whether it is currently located in the spatial region identified by the identification information.

15. The device according to claim 14, wherein the monitoring is performed with synchronized timers, wherein the data telegram comprises a time stamp, wherein the synchronized timers comprise a first and second timers of the diagnostic unit and a receiver unit of the diagnostic unit, and wherein the second timer of the synchronized timers is designed to serve as a reference timer for synchronizing the first timer with a timer arranged in the central control apparatus, and wherein the receiver unit is designed to monitor the transmission duration as a function of the time stamp contained in the data telegram and using the first timer.

16. The device according to claim 14, wherein the monitoring is performed by establishing the data connection configured for the bidirectional communication with the central control apparatus, via which the data telegram is transmitted, wherein the diagnostic unit for monitoring the transmission duration of the unidirectional transmission of the data telegram from the central control apparatus to the device, further comprises a diagnostic unit that is designed to:
monitor the transmission quality of the data connection configured for bidirectional communication;
monitor the transmission duration of the unidirectional transmission of the data telegram as a function of the monitored transmission quality; and
trigger a predetermined safety reaction if the transmission duration exceeds a predetermined value.

17. The device according to claim 14, wherein the diagnostic unit for monitoring the transmission duration of the unidirectional transmission of the data telegram from the central control apparatus to the device, further comprises a receiver unit and/or a first timer.

18. A control and data transmission system comprising:
a central control apparatus for controlling a plurality of decentralized devices, wherein the central control apparatus is designed for generating a data telegram for the multicast transmission of data to a group of the decentralized devices that are located in a defined spatial region, the data telegram comprising identification information that identifies the defined spatial region, the central control apparatus comprising:

a central controller:

a transmitter unit for unidirectionally transmitting the data telegram to at least one of the decentralized devices of the group, the at least one of the decentralized devices of the group being designed to recognize whether it is currently located in the spatial region identified by the identification information, wherein the data telegram is transmitted wirelessly from the central control apparatus to the at least one of the decentralized devices of the group; and a receiver unit, a timer and/or a diagnostic unit for monitoring the transmission duration of the unidirectional transmission of the data telegram from the central control apparatus to the at least one of the decentralized devices of the group;

wherein each one of the decentralized devices of the group is designed as an automated guided vehicle that can be controlled by the central control apparatus, wherein each one of the decentralized devices of the group is designed to receive the unidirectionally transmitted data telegrams and wherein each one of the decentralized devices of the group is designed to recognize whether it is currently located in the spatial region identified by the identification information, and each one of the decentralized devices of the group comprising:

a diagnostic unit for monitoring the transmission duration of the unidirectional transmission of the data telegram from the central control apparatus to the decentralized devices of the group, wherein the diagnostic unit of each one of the decentralized devices of the group is designed for triggering a predetermined safety reaction if the transmission duration exceeds a predetermined value; and a communication network via which the central control apparatus can transmit data to each one of the decentralized devices of the group.

19. The control and data transmission system according to claim 18, wherein the diagnostic unit for monitoring the transmission duration of the unidirectional transmission of the data telegram from the central control apparatus to the decentralized devices of the group, further comprises a receiver unit and/or a first timer.

* * * * *